(12) United States Patent
Kim et al.

(10) Patent No.: US 11,368,858 B2
(45) Date of Patent: *Jun. 21, 2022

(54) METHOD AND APPARATUS FOR FEEDING BACK AGGREGATED CHANNEL STATE INFORMATION IN COOPERATIVE MULTIPOINT COMMUNICATION SYSTEM

(71) Applicant: LG ELECTRONICS INC., Seoul (KR)

(72) Inventors: Hyungtae Kim, Anyang-si (KR); Hanbyul Seo, Anyang-si (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/527,426

(22) Filed: Jul. 31, 2019

(65) Prior Publication Data
US 2019/0357062 A1    Nov. 21, 2019

Related U.S. Application Data

(63) Continuation of application No. 15/961,124, filed on Apr. 24, 2018, now Pat. No. 10,412,606, which is a
(Continued)

(51) Int. Cl.
| | | |
|---|---|---|
| *H04W 24/02* | (2009.01) | |
| *H04L 5/00* | (2006.01) | |
| *H04B 7/024* | (2017.01) | |
| *H04B 7/06* | (2006.01) | |
| *H04L 1/20* | (2006.01) | |

(52) U.S. Cl.
CPC .......... *H04W 24/02* (2013.01); *H04B 7/024* (2013.01); *H04B 7/0626* (2013.01); *H04L 5/0035* (2013.01); *H04L 5/0048* (2013.01); *H04L 5/0057* (2013.01); *H04L 1/20* (2013.01)

(58) Field of Classification Search
CPC ..... H04W 24/02; H04B 7/024; H04B 7/0626; H04L 5/0035
See application file for complete search history.

(56) References Cited

U.S. PATENT DOCUMENTS

| | | | | |
|---|---|---|---|---|
| 8,599,708 B2* | 12/2013 | Chen | ...................... | H04W 24/08 370/252 |
| 9,144,045 B2* | 9/2015 | Koorapaty | ............ | H04L 5/0057 |

(Continued)

OTHER PUBLICATIONS

Pantech, "Discussion on collision avoidance between CSI-RS and PRS", Discussion and Decision, 3GPP TSG RAN WG1 Meeting #64, Taipei, Feb. 21-25, 2011, R1-110753, pp. 1-5.
(Continued)

*Primary Examiner* — Rhonda L Murphy
(74) *Attorney, Agent, or Firm* — Fish & Richardson P.C.

(57) ABSTRACT

A method of reporting channel state information (CSI) by a user equipment (UE) in a wireless communication system, includes receiving, from a base station (BS), first information on a set of CSI-reference signal resource element (CSI-RS RE) configurations and second information on a time resource configuration; obtaining CSI based on the first and the second information; and reporting, to the BS, the CSI, wherein the time resource configuration includes a CSI-RS periodicity commonly used for the CSI-RS RE configurations in the set.

16 Claims, 12 Drawing Sheets

Related U.S. Application Data continuation of application No. 14/353,217, filed as application No. PCT/KR2012/008930 on Oct. 29, 2012, now Pat. No. 9,986,444.

(60) Provisional application No. 61/551,944, filed on Oct. 27, 2011.

(56) References Cited

U.S. PATENT DOCUMENTS

| | | |
|---|---|---|
| 9,407,409 B2 * | 8/2016 | Bhattad ................ H04L 5/0035 |
| 2012/0281654 A1 | 11/2012 | Aiba et al. |
| 2013/0003788 A1 | 1/2013 | Marinier et al. |
| 2013/0128813 A1 | 5/2013 | Yang et al. |
| 2015/0237523 A1 | 8/2015 | Chun et al. |
| 2016/0100385 A1 | 4/2016 | Lee et al. |
| 2017/0012691 A1 | 1/2017 | Lee et al. |

OTHER PUBLICATIONS

Renesas Mobile Europe Ltd., "On CSI feedback for multi-point transmission", Discussion and decision, 3GPP TSG-RAN WG1 Meeting #66bis, Zhuhai, China, Oct. 10-14, 2011, R1-113171, pp. 1-3.

Texas Instruments, "On reference signals configuration of DL CoMP", Discussion and decision, 3GPP TSG RAN WG1 Meeting #66 bis, Zhuhai, P.R. China, Oct. 10-14, 2011, R1-113251, pp. 1-3.

* cited by examiner

FIG. 5
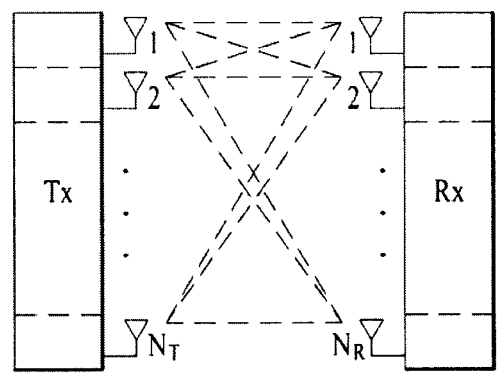
(a)
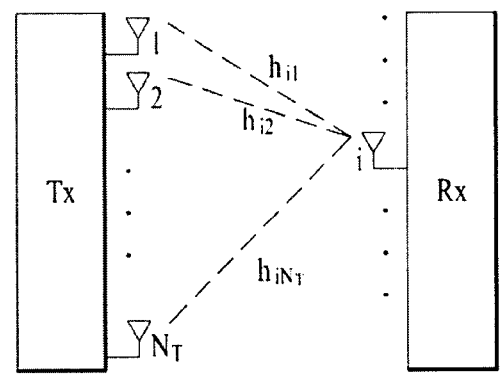
(b)

METHOD AND APPARATUS FOR FEEDING BACK AGGREGATED CHANNEL STATE INFORMATION IN COOPERATIVE MULTIPOINT COMMUNICATION SYSTEM

CROSS-REFERENCE TO RELATED APPLICATIONS

This application is a Continuation of U.S. patent application Ser. No. 15/961,124 filed on Apr. 24, 2018, which is a Continuation of U.S. patent application Ser. No. 14/353,217 filed on Apr. 21, 2014 (now U.S. Pat. No. 9,986,444 issued May 29, 2018), which is the National Phase of PCT International Application No. PCT/KR2012/008930 filed on Oct. 29, 2012, which claims the priority benefit under 35 U.S.C. § 119(e) to U.S. Provisional Application No. 61/551,944 filed on Oct. 27, 2011, all of these applications are hereby expressly incorporated by reference into the present application.

BACKGROUND OF THE INVENTION

Field of the Invention

Following description relates to a wireless communication system, and more particularly, to a method of giving a feedback on aggregated CSI (channel state information) using multiple CSI-RS (channel state information-reference signal) configuration information in a wireless communication system supporting CoMP (coordinated multi-point) and an apparatus therefor.

Discussion of the Related Art

A MIMO (multi-input multi-output) technology is a technology configured to enhance efficiency of data transmission and reception using a plurality of transmitting antennas and a plurality of receiving antennas instead of using a single transmitting antenna and a single receiving antenna. If a single antenna is used, a receiving side receives data via a single antenna path. On the contrary, if multiple antennas are used, the receiving end receives data via various paths. Hence, by using the MIMO, data transmission speed and an amount of data transmission can be enhanced and coverage can also be enlarged.

A single-cell MIMO operation can be classified into a single user-MIMO (SU-MIMO) scheme and a multi user-MIMO (MU-MIMO) scheme. The SU-MIMO is a scheme that a single user equipment receives a downlink signal in one cell. The MU-MIMO is a scheme that two or more user equipments receive a downlink signal in one cell.

Meanwhile, a study on a CoMP (coordinated multi-point) system to improve throughput of a user positioned at a cell boundary in a manner of applying an improved MIMO transmission in a multi-cell environment is actively progressing. If the CoMP system is applied, inter-cell interference can be reduced in the multi-cell environment and it may enhance overall performance of a system.

Channel estimation indicates a process of restoring a received signal in a manner of compensating for distortion of a signal generated by fading. In this case, the fading indicates a phenomenon that strength of a signal rapidly changes due to multi path-time delay in a wireless communication system environment. In order to perform the channel estimation, it is necessary to have a reference signal known to both a transmitter and a receiver. And, the reference signal can be simply called an RS (reference signal) or a pilot depending on an applied standard.

A downlink reference signal is a pilot signal used for a coherent demodulation and includes PDSCH (physical downlink shared channel), PCFICH (physical control format indicator channel), PHICH (physical hybrid indicator channel), PDCCH (physical downlink control channel), and the like. The downlink reference signal can be classified into a common reference signal (CRS) shared by all user equipments in a cell and a dedicated reference signal (DRS) used for a specific user equipment only. Compared to a legacy communication system (e.g., a system following LTE release 8 or 9 standard) supporting 4 transmitting antennas, a system (e.g., a system supporting 8 transmitting antennas and following LTE-A standard) including an extended antenna configuration considers DRS-based data demodulation to manage an efficient reference signal and support a developed transmission scheme. In particular, in order to support data transmission via an extended antenna configuration, it is able to define a DRS for two or more layers. Since the DRS and data are precoded by an identical precoder, it may be easy for a receiving side to estimate channel information necessary for demodulating data without separate precoding information.

Meanwhile, the downlink receiving side is able to obtain precoded channel information for the extended antenna configuration via the DRS. Yet, in order to obtain channel information which is not precoded, it is necessary to have a separate reference signal except the DRS. Hence, the receiving side can define a reference signal to obtain channel state information (CSI), i.e., CSI-RS in the system following the LTE-A standard.

SUMMARY OF THE INVENTION

A technical task of the present invention is to efficiently feedback aggregated CSI in a CoMP communication system by using a plurality of CSI-RS configurations, which make a plurality of CSI-RSs to be transmitted in an identical subframe.

To achieve these and other advantages and in accordance with the purpose of the present invention, as embodied and broadly described, according to one embodiment, a method of feeding back an aggregated channel state information (CSI) on a cooperative transmission, which is fed back by a user equipment in a wireless communication system includes the steps of receiving a first CSI-RS configuration information and a second CSI-RS configuration information setting a CSI-RS (reference signal) to be transmitted to each of a first base station and a second base station participating in the cooperative transmission, receiving a first CSI-RS and a second CSI-RS based on the first CSI-RS configuration information and the second CSI-RS configuration information, calculating a first CSI and a second CSI using the first CSI-RS and the second CSI-RS, respectively, and transmitting the aggregated CSI, which is calculated based on the first CSI and the second CSI, wherein the first CSI-RS and the second CSI-RS are transmitted in an identical subframe only.

To further achieve these and other advantages and in accordance with the purpose of the present invention, according to a different embodiment, a method of receiving an aggregated channel state information (CSI) on a cooperative transmission, which is received by a base station in a wireless communication system includes the steps of transmitting a first CSI-RS configuration information and a second CSI-RS configuration information setting a CSI-RS (reference signal) to be transmitted to each of a first base station and a second base station participating in the cooperative transmission, transmitting a first CSI-RS and a second CSI-RS based on the first CSI-RS configuration information and the second CSI-RS configuration information, and receiving the aggregated CSI, which is calculated based on a first CSI according to the first CSI-RS and a second CSI according to the second CSI-RS, wherein the first CSI-RS and the second CSI-RS are transmitted in an identical subframe only.

According to a further different embodiment, a user equipment feeding back an aggregated channel state information (CSI) on a cooperative transmission in a wireless communication system includes a reception module configured to receive a downlink signal from a first base station and a second base station, a transmission module configured to transmit an uplink signal to the first base station and the second base station, and a processor configured to control the reception module and the transmission module, the processor configured to receive a first CSI-RS configuration information and a second CSI-RS configuration information setting a CSI-RS (reference signal) to be transmitted to each of a first base station and a second base station via the reception module, the processor configured to receive a first CSI-RS and a second CSI-RS based on the first CSI-RS configuration information and the second CSI-RS configuration information via the reception module, the processor configured to calculate a first CSI and a second CSI using the first CSI-RS and the second CSI-RS, respectively, the processor configured to transmit the aggregated CSI, which is calculated based on the first CSI and the second CSI, via the transmission module, wherein the first CSI-RS and the second CSI-RS are transmitted in an identical subframe.

According to a further different embodiment, a first base station supporting a CoMP (coordinated multi-point) communication includes a reception module configured to receive an uplink signal from a user equipment and configured to receive information between base stations from a second base station, a transmission module configured to transmit a downlink signal to the user equipment and configured to transmit the information between base stations to the second base station, and a processor configured to control the first base station including the reception module and the transmission module, the processor configured to transmit a first CSI-RS configuration information and a second CSI-RS configuration information setting a CSI-RS (reference signal) to be transmitted to each of a first base station and a second base station via the transmission module, the processor configured to transmit a first CSI-RS and a second CSI-RS based on the first CSI-RS configuration information and the second CSI-RS configuration information via the transmission module, the processor configured to receive the aggregated CSI, which is calculated based on a first CSI according to the first CSI-RS and a second CSI according to the second CSI-RS, via the reception module, wherein the first CSI-RS and the second CSI-RS are transmitted in an identical subframe.

Following items can be commonly applied to embodiments of the present invention.

The first CSI-RS configuration information and the second CSI-RS configuration information may include a period and an offset of an identical value.

The first CSI-RS and the second CSI-RS can be mapped to resource elements different from each other in the identical subframe.

The first CSI-RS and the second CSI-RS are mapped to an identical resource element and the first CSI-RS configuration information and the second CSI-RS configuration information can include scrambling codes different from each other.

The first CSI-RS configuration information and the second CSI-RS configuration information can be received via an independent RRC (radio resource control) signaling.

The first CSI-RS configuration information and the second CSI-RS configuration information can be received via an RRC (radio resource control) signaling sharing fields on a period and an offset.

The aggregated CSI may include at least one selected from the group consisting of an aggregated rank indicator (RI), an aggregated precoding matrix indicator (PMI), an aggregated channel quality indicator (CQI), and phase information between CSI-RSs.

The method may include the step of receiving an aggregated indicator indicating the aggregated CSI to be calculated using the first CSI-RS and the second CSI-RS.

It is to be understood that both the foregoing general description and the following detailed description are exemplary and explanatory and are intended to provide further explanation of the invention as claimed.

Accordingly, the present invention provides the following effects or advantages.

By using a plurality of CSI-RS configurations, which make a plurality of CSI-RSs to be transmitted in an identical subframe, it is able to efficiently feedback aggregated CSI in a CoMP communication system.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a configuration diagram of a wireless communication system including multiple antennas;

DETAILED DESCRIPTION OF THE EMBODIMENTS

Figure 1:
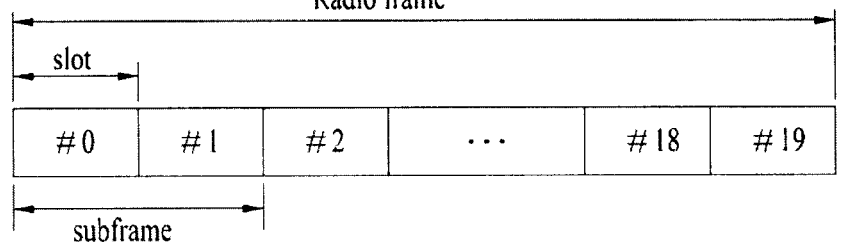
FIG. 1 is a diagram for a structure of a downlink radio frame.

The following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In this specification, embodiments of the present invention are described centering on the data transmission/reception relations between a base station and a user equipment. In this case, the base station has a meaning of a terminal node of a network directly communicating with a user equipment. In this disclosure, a specific operation explained as performed by a base station may be performed by an upper node of the base station in some cases.

In particular, in a network constructed with a plurality of network nodes including a base station, it is apparent that various operations performed for communication with a mobile station can be performed by a base station or other network nodes except the base station. 'Base station (BS)' may be substituted with such a terminology as a fixed station, a Node B, an eNode B (eNB), an access point (AP) and the like. A relay may be substituted with such a terminology as a relay node (RN), a relay station (RS), and the like. And, 'terminal' may be substituted with such a terminology as a user equipment (UE), an MS (mobile station), an MSS (mobile subscriber station), an SS (subscriber station), or the like.

Specific terminologies used in the following description are provided to help understand the present invention and the use of the specific terminologies can be modified into a different form in a range of not deviating from the technical idea of the present invention.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts in this specification.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX can be explained by IEEE 802.16e standard (wirelessMAN-OFDMA reference system) and evolved IEEE 802.16m standard (wirelessMAN-OFDMA advanced system). For clarity, the following description mainly concerns 3GPP LTE and LTE-A, by which the technical idea of the present invention may be non-limited.

First of all, a structure of a downlink radio frame is described with reference to FIG. 1 as follows.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 1 is a diagram for a structure of a type 1 radio frame. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

The above-described structures of the radio frame are exemplary only. And, the number of subframes included in a radio frame, the number of slots included in the subframe and the number of symbols included in the slot may be modified in various ways.

Figure 2:
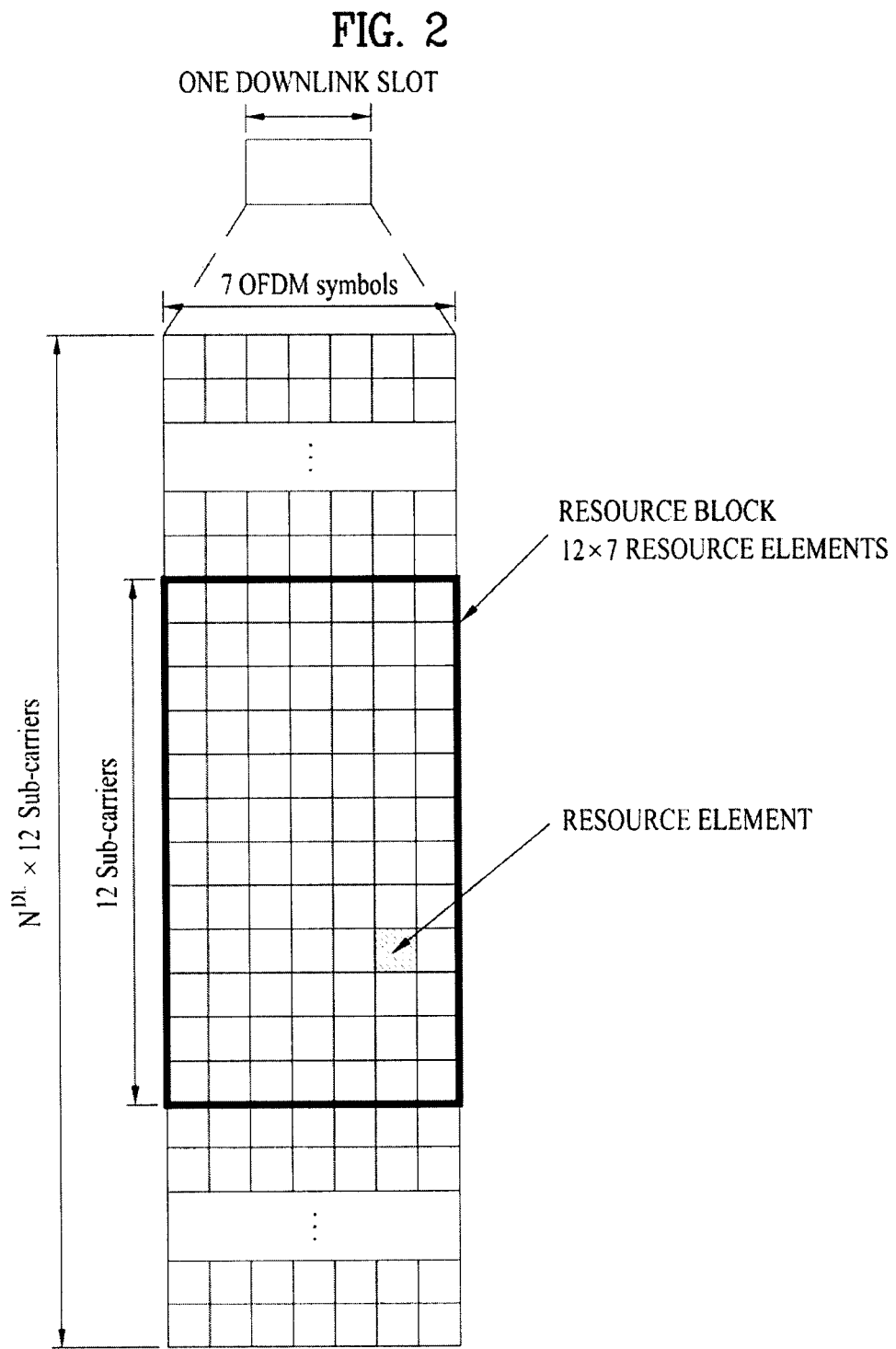
FIG. 2 is a diagram for an example of a resource grid in a downlink slot.

FIG. 2 is a diagram for an example of a resource grid in a downlink slot. The example shows a case that OFDM symbol is configured with a normal CP. Referring to FIG. 2, a downlink slot includes a plurality of OFDM symbols in time domain and includes a plurality of resource blocks in frequency domain. In this case, one downlink slot includes 7 OFDM symbols and one resource block includes 12 subcarriers, by which the present invention may be non-limited. Each element on a resource grid is called a resource element (RE). For instance, a resource element a (k, 1) corresponds to a resource element situated on a kth subcarrier and a first OFDM symbol. In case of a normal CP, one resource block includes 12×7 resource elements (in case of an extended CP, 12×6 resource elements). Since a space between subcarriers corresponds to 15 kHz, one resource block includes about 180 kHz in frequency domain. NDL corresponds to the number of resource blocks included in a downlink slot. A value of the NDL can be determined according to a downlink bandwidth configured by a scheduling of a base station.

Figure 3:
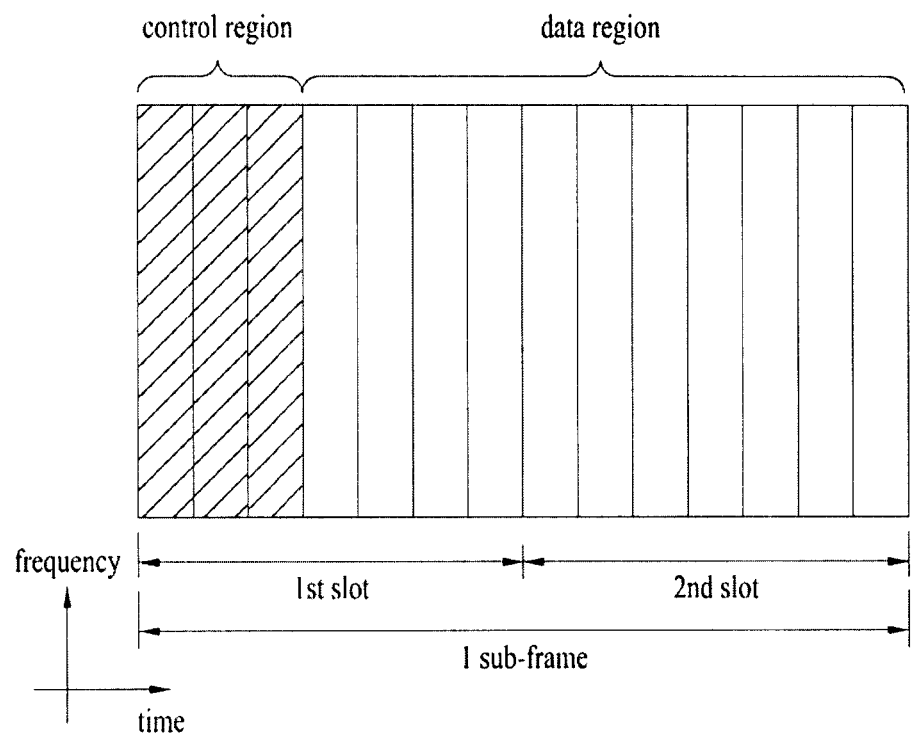
FIG. 3 is a diagram for a structure of a downlink subframe.

FIG. 3 is a diagram for a structure of a downlink (DL) subframe. Maximum 3 OFDM symbols situated in a head part of a first slot of one subframe correspond to a control region to which control channels are assigned. The rest of OFDM symbols correspond to a data region to which PDSCH (physical downlink shared channel) is assigned. One subframe corresponds to a basic unit of transmission. In particular, PDCCH and PDSCH are assigned using two slots. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH includes a HARQ ACK/NACK signal in response to UL transmission. Control information carried on PDCCH may be called downlink control information (hereinafter abbreviated DCI). The DCI may include UL scheduling information, DL scheduling information or a UL transmit power control command for a random UE (user equipment) group. PDCCH is able to carry resource allocation and transmission format of DL-SCH (downlink shared channel), resource allocation information of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs. A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). In order to indicate a random access response that is a response to a transmission of a random access preamble of a user equipment, CRC can be masked with RA-RNTI (random access-RNTI).

Figure 4:
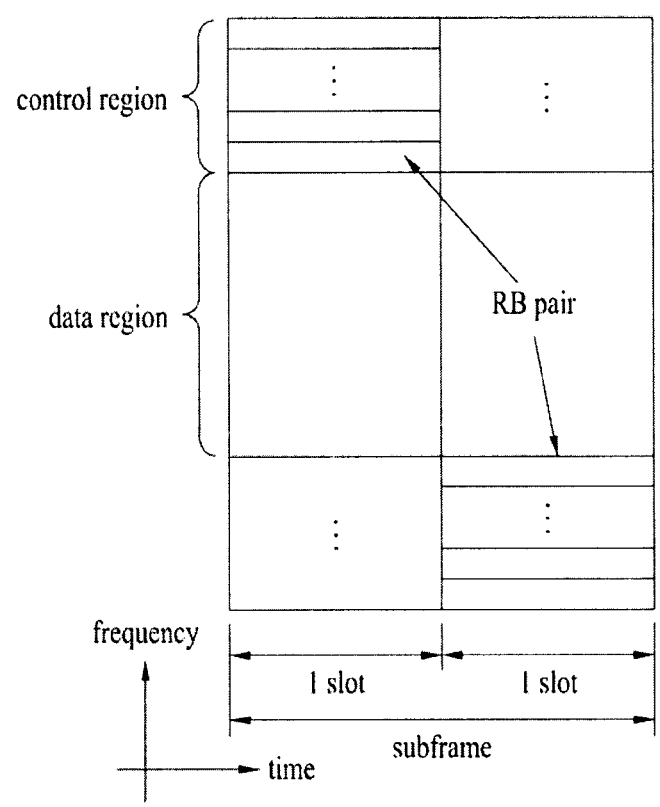
FIG. 4 is a diagram for a structure of an uplink subframe.

FIG. 4 is a diagram for a structure of an uplink (UL) subframe. Referring to FIG. 4, a UL subframe may be divided into a control region and a data region in frequency domain. A physical UL control channel (PUCCH), which includes UL control information, is assigned to the control region. And, a physical UL shared channel (PUSCH), which includes user data, is assigned to the data region. In order to maintain single carrier property, one user equipment does not transmit PUCCH and PUSCH simultaneously. PUCCH for one user equipment is assigned to a resource block pair (RB pair) in a subframe. Resource blocks belonging to the resource block (RB) pair may occupy different subcarriers in each of 2 slots. Namely, a resource block pair allocated to PUCCH is frequency-hopped on a slot boundary.

Multiple Input Multiple Output (MIMO) System Modeling

A MIMO (multiple input multiple output) system is a system configured to enhance efficiency of data transmission/reception using multiple transmitting antennas and multiple receiving antennas. A MIMO technology does not depend on a single antenna path to receive a whole message. Instead, the MIMO technology can receive a whole data in a manner of combining a plurality of data fragments received via a plurality of antennas.

The MIMO technology can be classified into a spatial diversity scheme and a spatial multiplexing scheme. The spatial diversity scheme is suitable for a data transmission to a user equipment moving at high speed since the spatial diversity scheme is able to increase transmission reliability or widen a cell radius via a diversity gain. The spatial multiplexing scheme can increase data transfer rate in a manner of simultaneously transmitting data different from each other without increasing system bandwidth.

FIG. 5 is a diagram for a wireless communication system including multiple antennas. As depicted in FIG. 5(a), unlike a case that a plurality of antennas are used in either a transmitter or a receiver only, if the number of transmitting antenna and the number of receiving antenna are increased to NT and NR, respectively, a theoretical channel transmission capacity is increased in proportional to the number of antenna. Consequently, a transfer rate is enhanced and frequency efficiency is dramatically enhanced. As the channel transmission capacity increases, the transfer rate can be theoretically increased as much as the maximum transfer rate (Ro) in case of using a single antenna multiplied by a rate of increase (Ri).

$$R_i = \min(N_T, N_R) \qquad \text{[Formula 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a 3rd generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

A communication method in the multi-antenna system is explained in more detail using a mathematical modeling. Assume that there exist NT number of transmitting antenna and NR number of receiving antenna in the system.

First of all, if we look into a transmission signal, in case that there exists NT number of transmitting antennas, the maximum number of information capable of being transmitted corresponds to NT. Transmission information can be represented as follows.

$$s = [s_1, s_2, \ldots, s_{N_T}]^T \quad \text{[Formula 2]}$$

Meanwhile, for each of the transmission informations $s_1, s_2, \ldots, s_{N_T}$, a transmit power may vary according to the each of the transmission informations. In this case, if each of the transmit powers is represented as $P_1, P_2, \ldots, P_{N_T}$, transmit power-adjusted transmission information can be represented as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Formula 3]}$$

And, if ŝ is represented using a diagonal matrix P, it can be represented as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

Meanwhile, let's consider a case that the $N_T$ number of transmission signal $x_1, x_2, \ldots, x_{N_T}$, which is practically transmitted, is configured in a manner of applying a weighted matrix W to the adjusted information vector ŝ. In this case, the weighted matrix W plays a role in distributing the transmission information to each of the antennas according to the situation of the transmission channel and the like. The transmission signal $x_1, x_2, \ldots, x_{N_T}$ can be represented using a vector X in the following Formula 5.

$$x = \begin{bmatrix} x_1 \\ x_2 \\ M \\ x_i \\ M \\ x_{N_T} \end{bmatrix} = \begin{bmatrix} w_{11} & w_{12} & \Lambda & w_{1N_T} \\ w_{21} & w_{22} & \Lambda & w_{2N_T} \\ M & & O & M \\ w_{i1} & w_{i2} & \Lambda & w_{iN_T} \\ M & & O & M \\ w_{N_T 1} & w_{N_T 2} & \Lambda & w_{N_T N_T} \end{bmatrix} \begin{bmatrix} \hat{s}_1 \\ \hat{s}_2 \\ M \\ \hat{s}_j \\ M \\ \hat{s}_{N_T} \end{bmatrix} = W\hat{s} = WPs \quad \text{[Formula 5]}$$

In this case, $W_{ij}$ means a weighting between an $i^{th}$ transmitting antenna and $j^{th}$ information. The W is called a precoding matrix as well.

Meanwhile, the transmission signal X can be considered with methods different from each other in accordance with two cases (e.g., spatial diversity and spatial multiplexing). In case of the spatial multiplexing, different signals are multiplexed and a multiplexed signal is transmitted to a receiving end. Hence, an element of information vector(s) may have values different from each other. Meanwhile, in case of the spatial diversity, since an identical signal is repeatedly transmitted via a plurality of channel paths, the element of the information vector(s) may have an identical value. Of course, it is also able to consider a combination of the spatial diversity scheme and the spatial multiplexing scheme. In particular, for instance, an identical signal is transmitted via 3 transmitting antennas in accordance with the spatial diversity scheme and the rest of signals can be transmitted to the receiving end in a manner of being spatial multiplexed.

If there exists NR number of receiving antenna, a reception signal for each antenna can be represented as a vector in the following Formula 6.

$$y = [y_1, y_2, \ldots, y_{N_R}]^T \quad \text{[Formula 6]}$$

In case of modeling a channel in a multi-antenna wireless communication system, the channel can be distinguished by a transmitting and receiving antenna index. The channel passing through a transmitting antenna j to receiving antenna i is represented as $h_{ij}$. According to the $h_{ij}$, it should be cautious that a receiving antenna index comes first and a transmitting antenna index comes later.

Meanwhile, FIG. 5 (b) is a diagram of channels passing through from NT number of transmitting antennas to the receiving antenna i. The channels can be represented as a vector and a matrix form in a manner of being collected. According to FIG. 5 (b), a channel starting from the total NT number of transmitting antennas and arriving at the receiving antenna i can be represented as follows.

$$h_i^T = [h_{i1}, h_{i2}, \ldots, h_{iN_T}] \quad \text{[Formula 7]}$$

Hence, all channels starting from the $N_T$ number of transmitting antennas and arriving at the $N_R$ number of receiving antennas can be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \ldots & h_{N_R N_T} \end{bmatrix} \quad \text{[Formula 8]}$$

Practically, after passing through the channel matrix H, an Additive White Gaussian Noise (AWGN) is added to the channel. The Additive White Gaussian Noise (AWGN)

added to the each of the $N_R$ number of receiving antennas can be represented as follows.

$$n=[n_1, n_2, \ldots, n_{N_R}]^T \quad \text{[Formula 9]}$$

According to the aforementioned mathematical modeling, a reception signal can be represented as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Formula 10]}$$

$$Hx + n$$

Numbers of column and row of the channel matrix H, which indicates a state of a channel, is determined by the number of transmitting/receiving antenna. In the channel matrix H, the number of row corresponds to the number of receiving antennas NR and the number of column corresponds to the number of transmitting antennas NT. In particular, the channel matrix H corresponds to a matrix of NR×NT.

Since a rank of the channel matrix is defined by a minimum number of the numbers of row or column independent from each other, the rank of the matrix is configured not to be greater than the number of the row or the column. The rank rank(H) of the channel matrix H is restricted as follows.

$$\text{rank}(H) \leq \min(N_T, N_R) \quad \text{[Formula 11]}$$

In performing MIMO transmission, 'rank' indicates the number of paths capable of independently transmitting a signal and 'the number of layers' indicates the number of signal streams transmitted via each of the paths. In general, since a transmitting end transmits layers corresponding to the number of ranks, a rank may have a same meaning with the number of layer unless there is a specific citation.

Reference Signal (RS)

When a packet is transmitted in a wireless communication system, since the packet is transmitted via a radio channel, a signal may be distorted in the course of transmission. In order for a receiving end to correctly receive a distorted signal, it may be preferable that the distorted and received signal is corrected using channel information. In order to find out the channel information, a signal known to both of a transmitting end and the receiving end is transmitted and finds out the channel information with the extent of distortion when the signal is received on a channel. The signal is called a pilot signal or a reference signal.

When a data is transmitted/received using MIMO antenna, it may be preferable that a channel state between a transmitting antenna and a receiving antenna is detected in order for a receiving end to correctly receive the data. Hence, in order for the receiving end to detect the channel state, each transmitting antenna of the transmitting end may preferably have an individual reference signal.

In a mobile communication system, a reference signal (RS) is mainly classified into two types in accordance with a purpose of the RS. One type of the RS is used to obtain channel information and another type of the RS is used to demodulate data. Since the former one is the RS to make a UE obtain DL channel information, it is transmitted in wideband. Although a UE does not receive DL data in a specific subframe, the UE should receive and measure the corresponding RS. This sort of RS can also be used for performing a measurement for a handover and the like. In case that a base station transmits a resource in DL, the latter one corresponds to an RS transmitted together with the resource. A UE can perform channel estimation by receiving the RS and may be then able to demodulate data. This sort of RS should be transmitted to a region to which the data is transmitted.

A legacy 3GPP LTE (e.g., 3GPP LTE release-8) system defines two types of downlink RS for a unicast service. One is a common RS (CRS) and another is a dedicated RS (DRS). The CRS is used to obtain information on a channel state and perform a measurement for a handover and the like. The CRS is also called a cell-specific RS. The DRS is used to demodulate data and may be named a UE-specific RS. In the legacy 3GPP LTE system, the DRS is only used for the use of data demodulation and the CRS can be used for two purposes, i.e., obtaining channel information and performing data demodulation.

The CRS is a cell-specifically transmitted RS and transmitted in every subframe for a wideband. The CRS for maximum 4 antenna ports can be transmitted according to the number of transmitting antennas of a base station. For instance, if the number of antenna ports of the base station corresponds to 2, a CRS for 0th antenna port and a CRS for 1st antenna port are transmitted. If the number of antenna ports of the base station corresponds to 4, CRSs for 0 to 3rd antenna port are transmitted, respectively.

Figure 6:
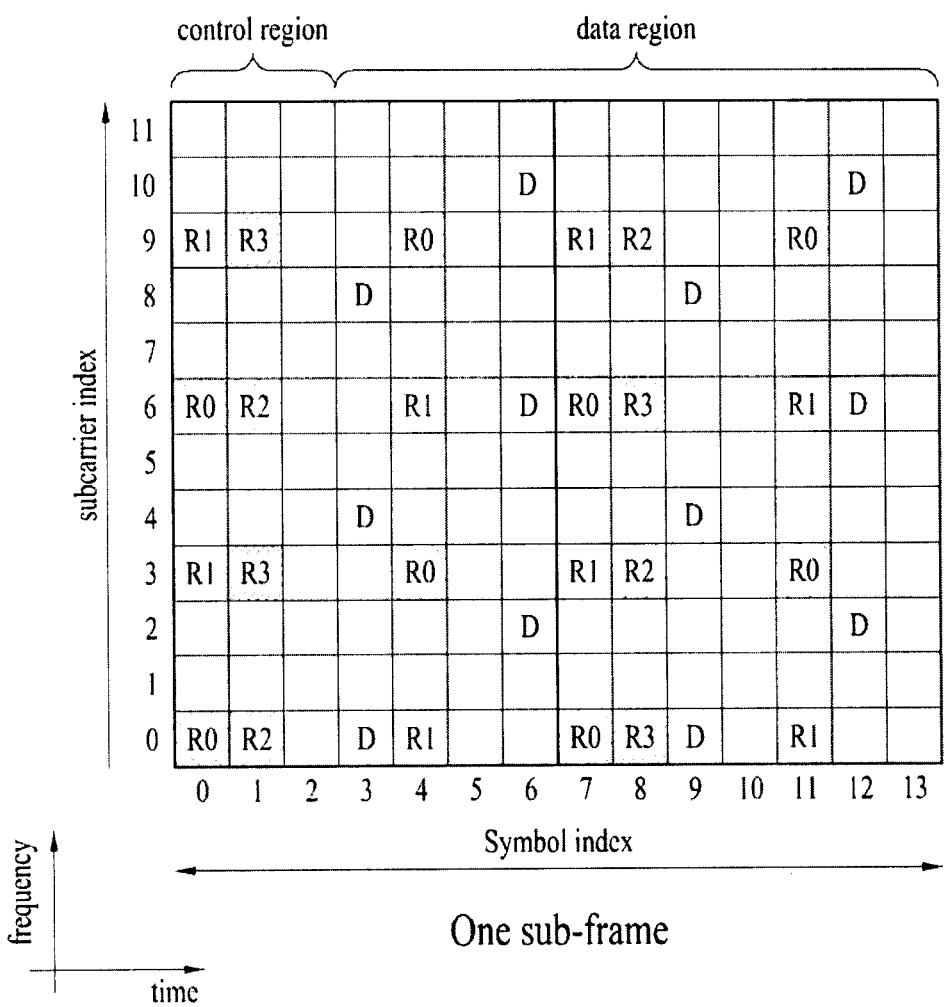
FIG. 6 is a diagram for a pattern of a legacy CRS and a pattern of a legacy DRS.

FIG. 6 is a diagram for a pattern of a CRS and a DRS on one resource block (in case of a normal CP, 14 OFDM symbols in time domain×12 subcarriers in frequency domain) in a system supporting 4 transmitting antennas. In FIG. 6, resource elements (RE) represented as 'R0', 'R1', 'R2', and 'R3' indicate a position of the CRS for an antenna port 0, 1, 2, and 3, respectively. Meanwhile, a resource element represented as 'D' in FIG. 6 indicates a position of the DRS defined in LTE system.

In LTE-A system, which is an evolved version of LTE system, maximum 8 transmitting antennas can be supported in DL. Hence, it is also necessary to support RS for the maximum 8 transmitting antennas. Since a downlink RS is defined for maximum 4 antenna ports only in LTE system, if a base station includes more than 4 and maximum 8 DL transmitting antennas in LTE-A system, it is necessary to additionally define RS for the antenna ports. As the RS for the maximum 8 transmitting antenna ports, it should consider both the RS for channel estimation and the RS for data demodulation.

One of the important considerations in designing LTE-A system is backward compatibility. The backward compatibility means to support a legacy LTE UE to properly operate in LTE-A system. In terms of a transmission of an RS, if the RS for the maximum 8 transmitting antenna ports is added to time-frequency domain where a CRC defined in LTE standard is transmitted to whole band in every subframe, RS overhead becomes considerably big. Hence, in case of newly designing the RS for the maximum 8 antenna ports, it should consider the RS overhead.

A newly introduced RS in LTE-A system can be mainly classified into two types. One is a channel state information RS (CSI-RS) used for a purpose of channel measurement to select a transmission rank, modulation and coding scheme (MCS), precoding matrix index (PMI) and the like. Another one is a demodulation RS (DM RS) used for a purpose of demodulating data transmitted via the maximum 8 transmitting antennas.

Unlike the CRS in the legacy LTE system used for the purpose of demodulating data as well as measuring a channel, handover, and the like, the CSI-RS used for the purpose of channel measurement is designed for the purpose of mainly measuring a channel. Of course, the CSI-RS can also be used for the purpose of measuring handover and the like. Unlike the CRS in the legacy LTE system, since the CSI-RS is transmitted to obtain information on a channel state only, it is not necessary to transmit the CSI-RS in every subframe. Hence, it is able to design the CSI-RS to be intermittently (e.g., periodically) transmitted in time axis to reduce overhead of the CSI-RS.

In case of transmitting data in a prescribed DL subframe, DM RS is dedicatedly transmitted to a UE in which data transmission is scheduled. A specific UE-dedicated DM RS can be designed to be transmitted to a resource region in which the UE is scheduled, i.e., time-frequency domain to which data on the UE is transmitted only.

Figure 7:
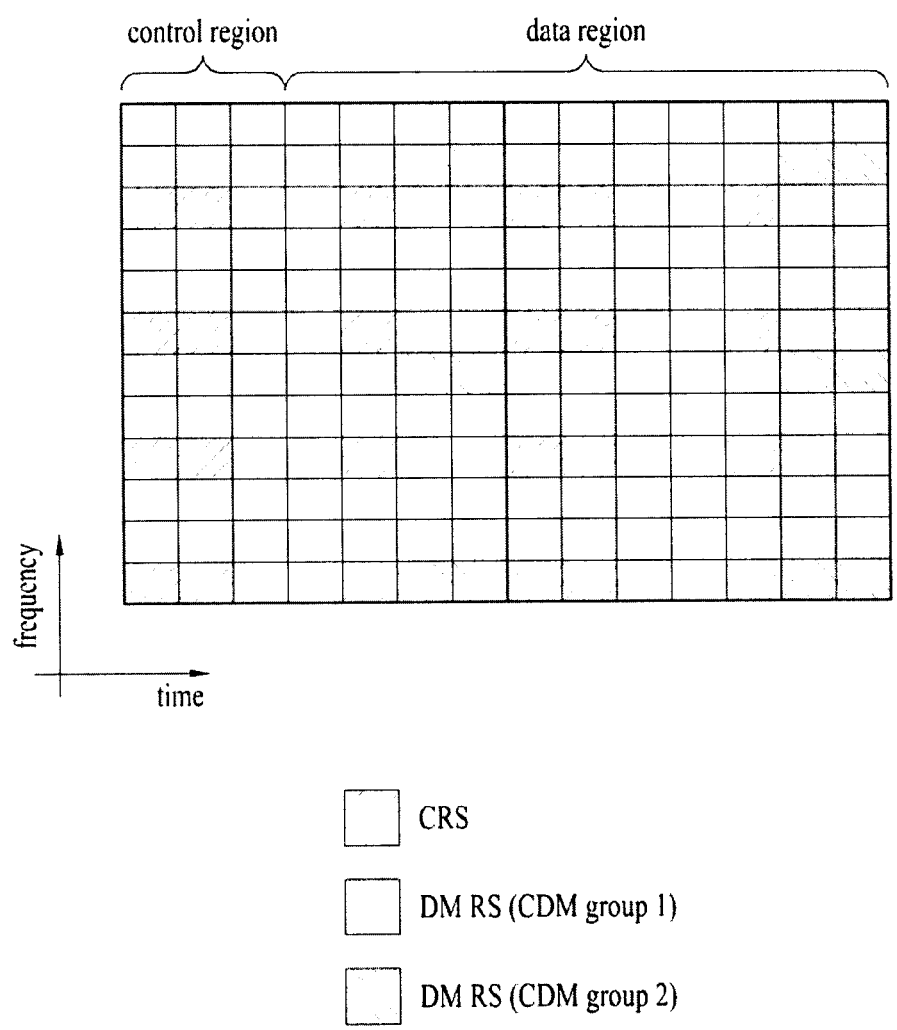
FIG. 7 is a diagram for an example of a DM RS pattern.

FIG. 7 is a diagram for an example of a DM RS pattern defined in LTE-A system. FIG. 7 shows a position of a resource element to which a DM RS is transmitted on one resource block (in case of a normal CP, 14 OFDM symbols in time domain×12 subcarriers in frequency domain) in which DL data is transmitted. The DM RS can be transmitted in response to 4 antenna ports (antenna port index 7, 8, 9, and 10) additionally defined in LTE-A system. The DM RS for antenna ports different from each other can be distinguished from each other in a manner of being positioned at frequency resources (subcarriers) different from each other and/or time resources (OFDM symbols) different from each other (i.e., the DM RS for antenna ports different from each other can be multiplexed by FDM and/or TDM scheme). And, the DM RS for antenna ports different from each other positioned at an identical time-frequency resource can be distinguished from each other by an orthogonal code (i.e., the DM RS for antenna ports different from each other can be multiplexed by CDM scheme). Referring to the example of FIG. 7, DM RSs for an antenna port 7 and 8 can be positioned at resource elements (REs) represented as a DM RS CDM group 1 and the DM RSs for the antenna port 7 and 8 can be multiplexed by the orthogonal code. Similarly, referring to the example of FIG. 7, DM RSs for an antenna port 9 and 10 can be positioned at resource elements (REs) represented as a DM RS CDM group 2 and the DM RSs for the antenna port 9 and 10 can be multiplexed by the orthogonal code.

Figure 8:
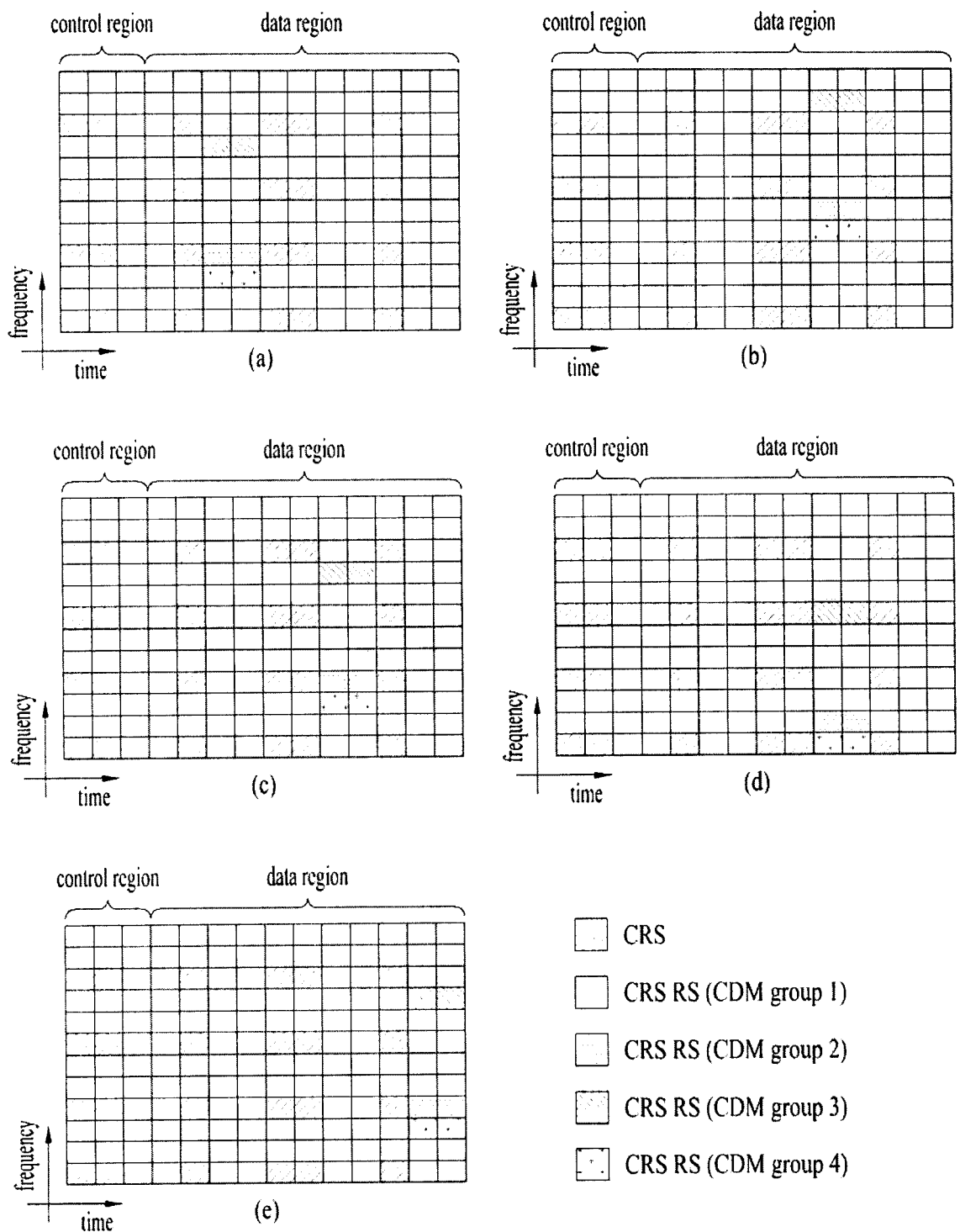
FIG. 8 is a diagram for examples of a CSI-RS pattern.

FIG. 8 is a diagram for examples of a CSI-RS pattern defined in LTE-A system. FIG. 8 shows a position of a resource element to which a CSI-RS is transmitted on one resource block (in case of a normal CP, 14 OFDM symbols in time domain×12 subcarriers in frequency domain) in which DL data is transmitted. One CSI-RS pattern among patterns depicted in FIG. 8 (a) to FIG. 8 (e) can be used in a prescribed DL subframe. The CSI-RS can be transmitted in response to 8 antenna ports (antenna port index 15, 16, 17, 18, 19, 20, 21 and 22) additionally defined in LTE-A system. The CSI-RS for antenna ports different from each other can be distinguished from each other in a manner of being positioned at frequency resources (subcarriers) different from each other and/or time resources (OFDM symbols) different from each other (i.e., the CSI-RS for antenna ports different from each other can be multiplexed by FDM and/or TDM scheme). And, the CSI-RS for antenna ports different from each other positioned at an identical time-frequency resource can be distinguished from each other by an orthogonal code (i.e., the CSI-RS for antenna ports different from each other can be multiplexed by CDM scheme). Referring to the example of FIG. 8 (a), CSI-RSs for an antenna port 15 and 16 can be positioned at resource elements (REs) represented as a CSI-RS CDM group 1 and the CSI-RSs for the antenna port 15 and 16 can be multiplexed by the orthogonal code. Referring to the example of FIG. 8 (a), CSI-RSs for an antenna port 17 and 18 can be positioned at resource elements (REs) represented as a CSI-RS CDM group 2 and the CSI-RSs for the antenna port 17 and 18 can be multiplexed by the orthogonal code. Referring to the example of FIG. 8 (a), CSI-RSs for an antenna port 19 and 20 can be positioned at resource elements (REs) represented as a CSI-RS CDM group 3 and the CSI-RSs for the antenna port 19 and 20 can be multiplexed by the orthogonal code. Referring to the example of FIG. 8 (a), CSI-RSs for an antenna port 21 and 22 can be positioned at resource elements (REs) represented as a CSI-RS CDM group 4 and the CSI-RSs for the antenna port 21 and 22 can be multiplexed by the orthogonal code. A principle explained on the basis of FIG. 8 (a) can be identically applied to FIG. 8 (b) to FIG. 8 (e).

The RS patterns depicted in FIG. 6 to FIG. 8 are just examples. Various examples of the present invention may be non-limited to a specific RS pattern. In particular, in case of using an RS pattern different from the RS patterns depicted in FIG. 6 to FIG. 8, various embodiments of the present invention can also be identically applied to the RS pattern.

Cooperative Multi-Point (CoMP)

According to an improved system performance requirement of a 3GPP LTE-A system, a CoMP transmission/reception technology MIMO (represented as a co-MIMO, a collaborative MIMO, a network MIMO, or the like) is proposed. The CoMP technology increases the performance of a user equipment situating at a cell edge and can increase an average sector throughput.

In general, in a multi-cell environment where a frequency reuse factor corresponds to 1, the performance of a user equipment situating at a cell boundary and the average sector throughput can be reduced due to inter-cell interference (ICI). In order to reduce the ICI, a legacy LTE system applied a method for enabling the user equipment situating at a cell boundary to have an appropriate throughput performance using such a simple passive scheme as a fractional frequency reuse (FFR) via a UE-specific power control in an environment limited by the interference. Yet, it may be more preferable to reduce the ICI or reuse the ICI as a signal that the user equipment wants than to lower the use of a frequency resource per cell. In order to achieve the aforementioned purpose, CoMP transmission scheme can be applied.

The CoMP scheme applicable in DL can be largely classified into a joint processing (JP) scheme and a coordinated scheduling/beamforming (CS/CB) scheme.

The JP scheme can use a data in each point (base station) of a CoMP cooperative unit. The CoMP cooperative unit means a set of base stations used for a cooperative transmission scheme. The JP scheme can be classified into a joint transmission scheme and a dynamic cell selection scheme.

The joint transmission scheme indicates a scheme transmitting PDSCH from a plurality of points (a part or entire CoMP cooperative units) at a time. In particular, the data transmitted to single user equipment can be simultaneously transmitted from a plurality of transmission points. According to the joint transmission scheme, quality of a reception signal can be coherently or non-coherently enhanced. And, interference for a different user equipment can be actively eliminated.

The dynamic cell selection scheme indicates a scheme transmitting PDSCH from a point (of a CoMP cooperative unit) at a time. In particular, a data transmitted to single user equipment on a specific timing point is transmitted from one point. A different point within the cooperative unit does not transmit a data to the corresponding user equipment on the specific timing point. The point transmitting the data to the corresponding user equipment can be dynamically selected.

Meanwhile, according to CS/CB scheme, the CoMP cooperative units can cooperatively perform a beamforming of data transmission for single user equipment. In this case, although the data is transmitted from a serving cell only, a user scheduling/beamforming can be determined by a coordination of cells in a corresponding CoMP cooperative unit.

Meanwhile, in case of UL, a coordinated multi-point reception means to receive a signal transmitted by coordination of a plurality of points, which are geographically apart from each other. The CoMP scheme applicable to a case of UL can be classified into a joint reception (JR) and the coordinated scheduling/beamforming (CS/CB).

The JR scheme means that a signal transmitted on PUSCH is received by a plurality of receiving points. The CS/CB scheme means that PUSCH is received at one point and a user scheduling/beamforming is determined by coordination of cells in a CoMP cooperative unit.

CSI-RS Configuration

As mentioned in the foregoing description, in LTE-A system supporting maximum 8 transmitting antennas in DL, a base station transmits CSI-RS for all antenna ports. In case of transmitting the CSI-RS for the maximum 8 transmitting antenna ports in every subframe, overhead of the CSI-RS becomes considerably big. Hence, in order to reduce the overhead, the CSI-RS should be intermittently transmitted in time axis instead of being transmitted in every subframe. To this end, the CSI-RS can be periodically transmitted with a period of integer multiple of one subframe or transmitted in a specific transmission pattern.

In this case, the period or the pattern used for transmitting the CSI-RS can be configured by a base station. In order to measure the CSI-RS, a UE should know CSI-RS configuration set to each of CSI-RS antenna ports of a cell to which the UE belongs thereto. The CSI-RS configuration may include a DL subframe index in which the CSI-RS is transmitted, a time-frequency position (e.g., CSI-RS pattern depicted in FIG. 8(a) to FIG. 8 (e)) of a CSI-RS resource element (RE) within a transmission subframe, a CSI-RS sequence (a sequence used for the purpose of CSI-RS and pseudo-randomly generated according to a prescribed rule based on a slot number, a cell ID, a length of CP and the like), and the like. In particular, a plurality of CSI-RS configurations can be used by a random (given) base station and the base station can inform a UE(s) of CSI-RS configuration to be used for the UE(s) within a cell among a plurality of the CSI-RS configurations.

And, since it is necessary to distinguish CSI-RS for each of the antenna ports from each other, resources to which the CSI-RS for each of the antenna ports is transmitted should be orthogonal to each other. As mentioned in the foregoing description with respect to FIG. 8, CSI-RSs for each of the antenna ports can be multiplexed with a FDM, TDM, and/or CDM scheme using orthogonal frequency resources, orthogonal time resources and/or orthogonal code resources.

When a base station informs UEs within a cell of information (CSI-RS configuration) on CSI-RS, the base station should firstly inform the UEs of information on time-frequency to which the CSI-RS for each antenna port is mapped. Specifically, information on the time may include numbers of subframe to which the CSI-RS is transmitted, CSI-RS transmission period, an offset of subframes to which the CSI-RS is transmitted, number of an OFDM symbol to which CSI-RS resource element (RE) of a specific antenna is transmitted, and the like. Information on the frequency may include a space of a frequency to which CSI-RS resource element (RE) of a specific antenna is transmitted, an offset or a shift value of an RE in a frequency axis, and the like.

Figure 9:
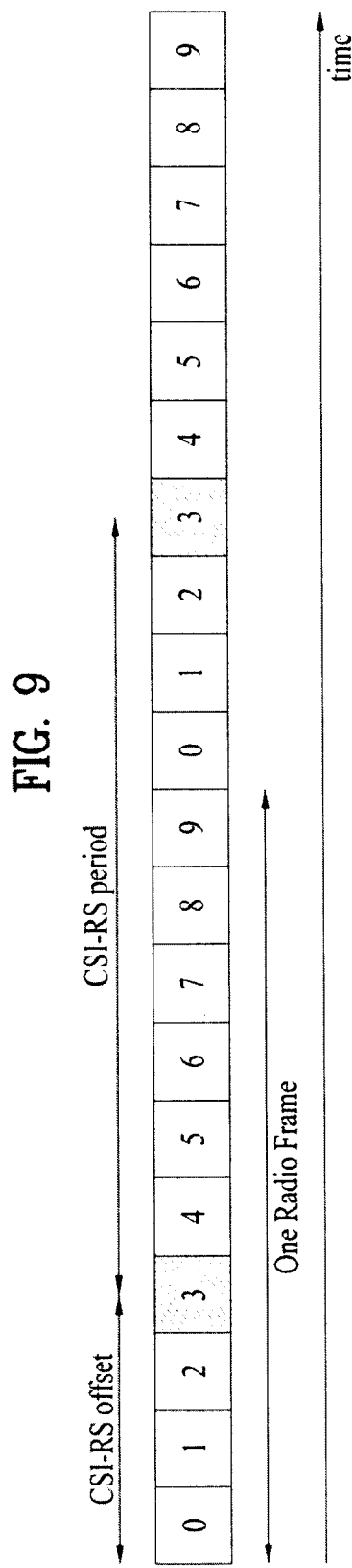
FIG. 9 is a diagram for explaining an example of a scheme periodically transmitting a CSI-RS.

FIG. 9 is a diagram for explaining an example of a scheme periodically transmitting a CSI-RS. The CSI-RS can be periodically transmitted with a period of integer multiple of one subframe (e.g., a period of 5 subframes, a period of 10 subframes, a period of 20 subframes, a period of 40 subframes, or a period of 80 subframe).

FIG. 9 shows that one radio frame includes 10 subframes (subframe number 0 to 9). For instance, FIG. 9 shows a case that a CSI-RS transmission period of a base station corresponds to 10 ms (i.e., 10 subframes) and CSI-RS transmission offset corresponds to 3. The offset value may vary according to each base station in order to make CSI-RSs of various cells to be evenly distributed. In case of transmitting the CSI-RS with a period of 10 ms, the offset value may have one of 0 to 9. Similar to this, in case of transmitting the CSI-RS with a period of 5 ms, the offset value may have one of 0 to 4, in case of transmitting the CSI-RS with a period of 20 ms, the offset value may have one of 0 to 19, in case of transmitting the CSI-RS with a period of 40 ms, the offset value may have one of 0 to 39, and, in case of transmitting the CSI-RS with a period of 80 ms, the offset value may have one of 0 to 79. The offset value indicates a value of a subframe in which the CSI-RS transmission is initialized by a base station transmitting the CSI-RS with a prescribed period. If the base station informs a UE of a transmission period of the CSI-RS and an offset value, the UE can receive the CSI-RS of the base station in a position corresponding to the subframe using the value. The UE measures a channel via the received CSI-RS and may be able to report such measurement result information as CQI, PMI, and/or RI (rank indicator) to the base station. In the present specification, the above-mentioned informations can be commonly called CQI (or CSI) except a case that the CQI, the PMI and the RI are explained in a manner of being distinguished from each other. And, the above-mentioned informations, which are relevant to the CSI-RS, are cell-specific informations. Hence, the informations can be commonly applied to UEs within a cell. And, the CSI-RS transmission period and the offset can be separately designated according to a CSI-RS configuration.

Figure 10:
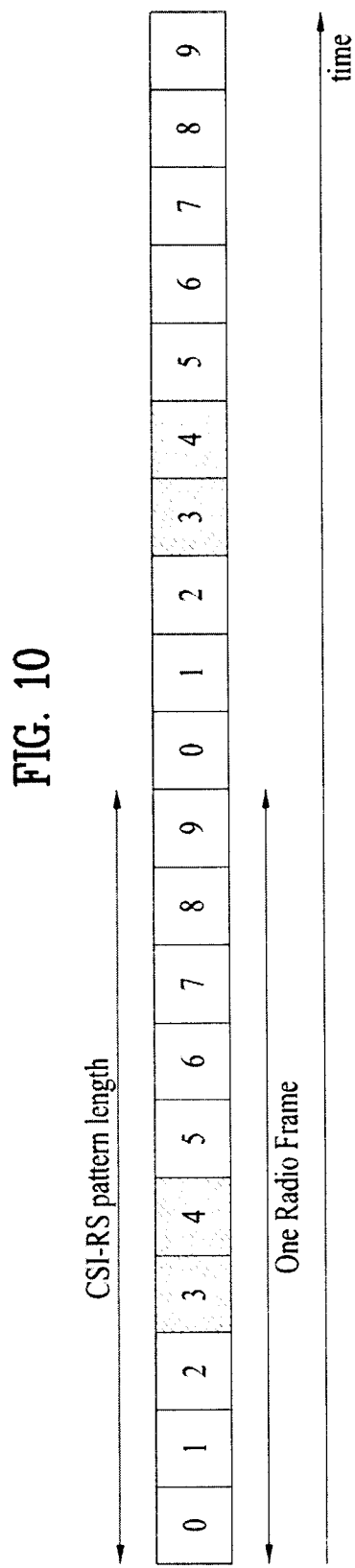
FIG. 10 is a diagram for explaining an example of a scheme non-periodically transmitting a CSI-RS.

FIG. 10 is a diagram for explaining an example of a scheme non-periodically transmitting a CSI-RS. FIG. 10 shows a radio frame including 10 subframes (subframe number 0 to 9). As depicted in FIG. 10, a subframe to which the CSI-RS is transmitted can be configured with a specific pattern. For instance, a CSI-RS transmission pattern can be configured by a unit of 10 subframes and whether the CSI-RS is transmitted can be designated by 1-bit indicator in each subframe. The example of FIG. 10 shows the CSI-RS pattern transmitted in a subframe index 3 and 4 among the 10 subframes (subframe index 0 to 9). The indicator can be provided to the UE via an upper layer signaling.

As mentioned in the foregoing description, configuration on the CSI-RS transmission can be variously configured. In order for the UE to perform channel measurement by properly receiving the CSI-RS, it is necessary for the base station to inform the UE of the CSI-RS configuration. Embodiments of the present invention to inform the UE of the CSI-RS configuration are explained in the following description.

Schemes of Informing UE of CSI-RS

In general, a scheme for a base station to inform a UE of CSI-RS configuration can be classified into two schemes as follow.

As a first scheme, the base station can broadcast information on the CSI-RS configuration to UEs using a dynamic broadcast channel (DBCH) signaling.

When the base station informs UEs of content on system information in a legacy LTE system, the base station generally transmits the information to the UEs on BCH (broadcasting channel). If the base station is unable to transmit the content on the system information to the UE on the BCH only since the content on the system information is too much, the base station may transmit the system information in a manner of masking PDCCH CRC of corresponding data using not a specific UE identifier (e.g., C-RNTI) but a system information identifier (SI-RNTI) while the base station transmits the system information with such a scheme as a general DL data. In this case, actual system information is transmitted on a PDSCH region like a general unicast data does. In doing so, all UEs within a cell decode PDCCH using the SI-RNTI, decode PDSCH indicated by the PDCCH, and may be then able to obtain the system information. The aforementioned broadcasting scheme may be named the DBCH (dynamic BCH) differentiated from the PBCH (physical PCH) corresponding to a general broadcasting scheme.

Meanwhile, system information broadcasted in a legacy LTE system can be mainly divided into two. One is a MIB (master information block) transmitted on PBCH and the other is a SIB (system information block) transmitted on a PDSCH region in a manner of being multiplexed with a general unicast data. Since the legacy LTE system defines informations transmitted by SIB type 1 to SIB type 8 (SIB1 to SIB8), a new SIB type can be defined for information on the CSI-RS configuration, which corresponds to new system information not defined in a legacy SIB type. For instance, a SIB9 or SIB10 can be defined in order for the base station to inform the UEs within a cell of the information on the CSI-RS configuration with a DBCH scheme.

As a second scheme, the base station can inform each of UEs of the information on the CSI-RS configuration using RRC (radio resource control) signaling. In particular, the information on the CSI-RS configuration can be provided to each of the UEs in a cell using a dedicated RRC signaling. For instance, in a process for a UE to establish a connection with the base station via an initial access or a handover, it is able to make the base station inform the UE of the CSI-RS configuration via the RRC signaling. Or, in case that the base station transmits an RRC signaling message, which makes a request for a channel state feedback based on the CSI-RS measurement, to the UE, the CSI-RS configuration can be informed to the UE via the RRC signaling message.

Indication of CSI-RS Configuration

The present invention proposes a scheme of using a plurality of CSI-RS configurations in a random base station and a scheme for a base station to transmit a CSI-RS according to each of a plurality of the CSI-RS configurations to a UE in a predetermined subframe. According to the scheme proposed by the present invention, the base station informs the UE of a plurality of the CSI-RS configurations and may inform the UE which CSI-RS is to be used for performing a channel state measurement for CQI (channel quality information) or CSI (channel state information) feedback among the CSI-RS configurations.

Detailed embodiment of the present invention in order for the base station to indicate a CSI-RS to be used for performing the CSI-RS configuration and channel measurement in the UE is described in the following.

Figure 11:
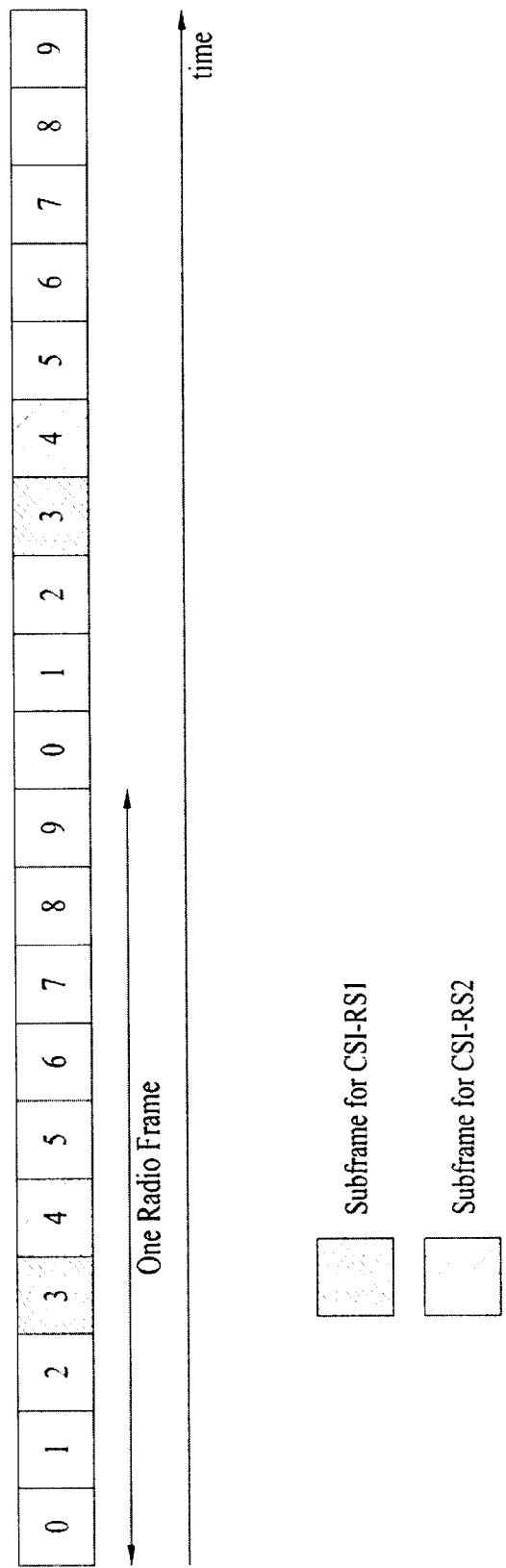
FIG. 11 is a diagram for explaining an example that two CSI-RS configurations are used.

FIG. 11 is a diagram for explaining an example that two CSI-RS configurations are used. FIG. 11 shows one radio frame including 10 subframes (subframe number 0 to 9). Referring to FIG. 11, a first CSI-RS configuration, i.e., a CSI-RS 1 has a CSI-RS transmission period of 10 ms and a CSI-RS transmission offset of 3. In FIG. 11, a second CSI-RS configuration, i.e., a CSI-RS 2 has a CSI-RS transmission period of 20 ms and a CSI-RS transmission offset of 4. The base station informs the UE of information on two CSI-RS configurations and may inform the UE which one of the two CSI-RS configurations is to be used for a CQI (or CSI) feedback.

If the CQI feedback for a specific CSI-RS configuration is requested from the base station, the UE can perform channel state measurement using a CSI-RS belonging to the corresponding CSI-RS configuration only. Specifically, a channel state is determined by CSI-RS reception quality and a function of noise/interference amount and correlation coefficient. Measurement of the CSI-RS reception quality is performed using the CSI-RS belonging to the corresponding CSI-RS configuration only. In order to measure the noise/interference amount and the correlation coefficient (e.g., interference covariance matrix indicating a direction of interference and the like), measurement can be performed in a subframe in which the corresponding CSI-RS is transmitted or designated subframes. For instance, referring to embodiment of FIG. 11, in case that the UE is requested to perform a feedback on a first CSI-RS configuration (CSI-RS 1) from the base station, the UE performs the reception quality measurement using a CSI-RS transmitted in a fourth subframe (subframe index 3) of one radio frame. In order for the UE to measure the noise/interference amount and the correlation coefficient, the UE can be separately designated to use an odd number subframe. Or, the UE can be designated to measure the CSI-RS reception quality and the noise/interference amount and correlation coefficient in a specific single subframe (e.g., subframe index 3) only.

For instance, reception signal quality measured by using a CSI-RS can be simply represented as 'S/(I+N)' as signal-to-interference plus noise ratio (SINR) (in this case, 'S' is strength of a reception signal, 'I' is an amount of interference, and 'N' is an amount of noise). The 'S' can be measured in a subframe including a CSI-RS via the CSI-RS in a subframe including a signal transmitted to the UE. Since the 'I' and 'N' vary according to the amount of interference from a neighboring cell, a direction of a signal transmitted from the neighboring cell, and the like, the 'I' and 'N' can be measured via a subframe in which the 'S' is measured, a CRS transmitted in a separately designated subframe, or the like.

In this case, the measurement of the amount of noise/interference and correlation coefficient can be performed via a CRS of a corresponding subframe or a resource element (RE) to which a CSI-RS is transmitted. Or, the measurement may be performed via a null resource element (null RE) configured to easily perform a noise/interference measurement. In order to perform the noise/interference measurement via the CRS or the CSI-RS RE, a UE firstly recovers the CRS or the CSI-RS and then subtracts a result of the recovery from a reception signal to set aside a noise and an interference signal. By doing so, the UE can obtain statistic of the noise/interference. The Null RE means an RE left empty (i.e., transmit power is 0 (zero)) by a corresponding base station without transmitting any signal. The Null RE makes easy to measure a signal from a different base station except the corresponding base station. Although all of the CRS RE, the CSI-RS RE, and the Null RE can be used to measure the noise/interference amount and the correlation coefficient, the base station can designate which of the REs is used to measure the noise/interference among the CRS RE, the CSI-RS RE, and the Null RE for the UE. This is because it is necessary to properly designate an RE to be measured by the UE according to whether a signal of a neighboring cell transmitted to a position of the RE in which the UE performs a measurement corresponds to a data signal or a control signal. Since the signal of the neighboring cell transmitted to the position of the RE varies according to whether an inter-cell synchronization is matched, the CRS configuration, the CSI-RS configuration, or the like, the base station can designate the RE to perform the measurement for the UE in a manner of identifying a type of the signal. In particular, the base station can designate the UE to measure the noise/interference using a part or all of the CRS RE, the CSI-RS RE, and the Null RE.

For instance, the base station can use a plurality of CSI-RS configurations. While informing the UE of one or more CSI-RS configurations, the base station can inform the UE of a CSI-RS configuration to be used for a CQI feedback and a position of the Null RE. The CSI-RS configuration to be used for the CQI feedback may correspond to a CSI-RS configuration transmitted by a non-zero transmit power differentiated from the Null RE transmitted by a transmit power, which is zero. For instance, it may be assumed that the base station informs the UE of one CSI-RS configuration necessary for the UE to perform channel measurement and a CSI-RS is transmitted with a non-zero transmit power in the one CSI-RS configuration. In addition, the base station informs the UE of a CSI-RS configuration in which a CSI-RS is transmitted with a transmit power of zero (i.e., a position of the Null RE) and the UE may assume that a position of the resource element (RE) corresponding to the CSI-RS configuration corresponds to zero transmit power. In other word, while informing the UE of one CSI-RS configuration corresponding to a non-zero transmit power, the base station can inform the UE of a position of a corresponding Null RE in case that there exists CSI-RS configuration corresponding to the zero transmit power.

As a modified example of the aforementioned CSI-RS configuration indication scheme, the base station informs the UE of a plurality of CSI-RS configurations and may inform the UE of a part or all of a plurality of the CSI-RS configurations to be used for a CQI feedback. By doing so, having requested the CQI feedback for a plurality of the CSI-RS configurations, the UE measures CQI using a CSI-RS corresponding to each of a plurality of the CSI-RS configurations and may transmit a plurality of measured CQI informations to the base station together.

Or, in order for the UE to transmit CQI for each of a plurality of the CSI-RS configurations to the base station, the base station can designate an UL resource, which is necessary for the UE to transmit the CQI, in advance according to each of a plurality of the CSI-RS configurations. Information on designation of the UL resource can be provided to the UE in advance via an RRC signaling.

Or, the base station can dynamically trigger the UE to transmit CQI for each of a plurality of the CSI-RS configurations to the base station. Dynamic triggering for the CQI transmission can also be performed via PDCCH. Information on CQI measurement to be performed for a prescribed CSI-RS configuration can be informed to the UE via PDCCH. Having received the PDCCH, the UE can feedback a CQI measurement result for the CSI-RS configuration designated on the corresponding PDCCH to the base station.

A transmission timing of a CSI-RS corresponding to each of a plurality of the CSI-RS configurations can be designated to be transmitted in subframes different from each other or in an identical subframe. In case that CSI-RSs according to CSI-RS configurations different from each other are designated to be transmitted in an identical subframe, it is necessary to distinguish the CSI-RSs from one another. In order to distinguish the CSI-RSs from one another according to the CSI-RS configurations different from each other, it may differently apply at least one selected from the group consisting of a time resource, a frequency resource and a code resource of the CSI-RS transmission. For instance, in a corresponding subframe, a position of an RE in which the CSI-RS is transmitted can be differently (e.g., a CSI-RS according to a CSI-RS configuration is transmitted in an RE position depicted in FIG. 8 (a) and a CSI-RS according to a different CSI-RS configuration is transmitted in an RE position depicted in FIG. 8 (b) in an identical subframe) designated according to a CSI-RS configuration (distinction using a time and frequency resource). Or, in case that the CSI-RSs according to the CSI-RS configurations different from each other are transmitted in an identical RE position, the CSI-RSs can be distinguished from each other by differently using a CSI-RS scrambling code in the CSI-RS configurations different from each other (distinction using a code resource).

CSI-RS Configuration for Aggregated CSI in CoMP System

In a CoMP system, a CoMP base station (hereinafter called base station) indicates a CSI-RS to be used by a CoMP user equipment (hereinafter called UE) for CSI-RS configuration and channel measurement. Specifically, in case of the CoMP system, the UE measures a CSI-RS for a neighboring cell as well as a CSI-RS for a serving cell and feedback channel information to the base station. In this case, the base station can indicate the UE to perform the CSI-RS configuration for the serving cell and the neighboring cell.

In the following description, multiple CSI-RS configurations configured to effectively calculate aggregated CSI in the CoMP system are explained in detail.

The aggregated CSI corresponds to information according to an aggregated CSI feedback method which is one of feedback methods used for a CoMP operation in LTE-A system. The aggregated CSI feedback method is a method of generating an optimal CSI in case that the UE assumes a specific CoMP operation and a plurality of base stations perform a cooperative transmission. For instance, the UE assumes that a plurality of the base stations perform a joint transmission scheme, calculates the aggregated CSI (e.g., aggregated RI, aggregated PMI, and aggregated CQI) at that time, and may be then able to transmit the aggregated CSI to the base station. As an example different from the aggregated CSI feedback method, there may exist a per-point based CSI feedback method. The per-point based CSI feedback method is a method that each base station generates CSI and feedback the CSI to the base station. For instance, in case that two base stations participate in a CoMP operation and a CSI-RS according to each base station is configured, the UE independently measures the CSI-RS according to the each base station and then generates CSI. In particular, the UE feedbacks each CSI, which is measured based on each CSI-RS, to the base station.

In case of using the aggregated CSI feedback method, as depicted in FIG. 11, when a CSI-RS is configured to subframes different from each other, it is not able to efficiently feedback the aggregated CSI. Referring to embodiment of FIG. 11, in order for the UE to calculate the aggregated CSI, the UE should wait until the UE measure channel quality using a CSI-RS transmitted from a fifth subframe (subframe index 4) after measuring the channel quality using a CSI-RS transmitted from a fourth subframe (subframe index 3) of a radio frame. In particular, after a channel state is measured using a CSI-RS for one base station, the UE should wait until the channel state is measured using a CSI-RS for the remaining base station. In this case, as the number of base stations increase, buffer size also increases. Moreover, an error (aging problem) may occur while the UE is waiting due to a time delay. In case of using the aforementioned per-point based CSI feedback method, since a CSI is calculated for each CSI-RS, an error problem due to the buffer or the time delay does not occur.

The aggregated CSI feedback method according to the present invention can resolve the aforementioned problem by configuring multiple CSI-RSs to be transmitted in an identical subframe. In particular, each of the multiple CSI-RSs can be transmitted in the identical subframe in a manner that a transmission period and offset of each of the multiple CSI-RSs is identically configured. In this case, configuration information of the each of the multiple CSI-RSs can be transmitted to the UE in a manner that fields on the transmission period and the offset are shared. Although the configuration information of the each of the multiple CSI-RSs is transmitted as an independent field without sharing the fields on the transmission period and the offset, each of the multiple CSI-RSs can be transmitted in the identical subframe in a manner that each of the CSI-RSs is mapped according to an identical transmission period and offset. In particular, in case of performing a feedback on the aggregated CSI, the UE expects that an aggregated CSI-RS is transmitted in an identical subframe. In this case, the base station makes each of the CSI-RSs to be transmitted in an identical subframe in a manner of configuring the transmission period and offset of each of the CSI-RSs with an identical value.

The configuration information of the each of the multiple CSI-RSs can be distinguished by at least one selected from the group consisting of CSI-RS transmission subframe configuration (transmission period and offset), CSI-RS antenna port (or RE position), and a code applied to CSI-RS.

In case that CSI-RSs different from each other are mapped to an identical resource element, a scrambling code applied to the CSI-RSs may correspond to an orthogonal code multiplied in time domain to distinguish the CSI-RSs from each another. In particular, the scrambling code applied to the CSI-RSs means a code resource configured to distinguish the CSI-RS configurations different from each other. Although the CSI-RSs relevant to each of transmission points (base stations) are mapped to an identical resource element, the CSI-RSs can be distinguished from each other without any interference in a manner that the orthogonal scrambling code is multiplied by each of the CSI-RSs.

Figure 12:
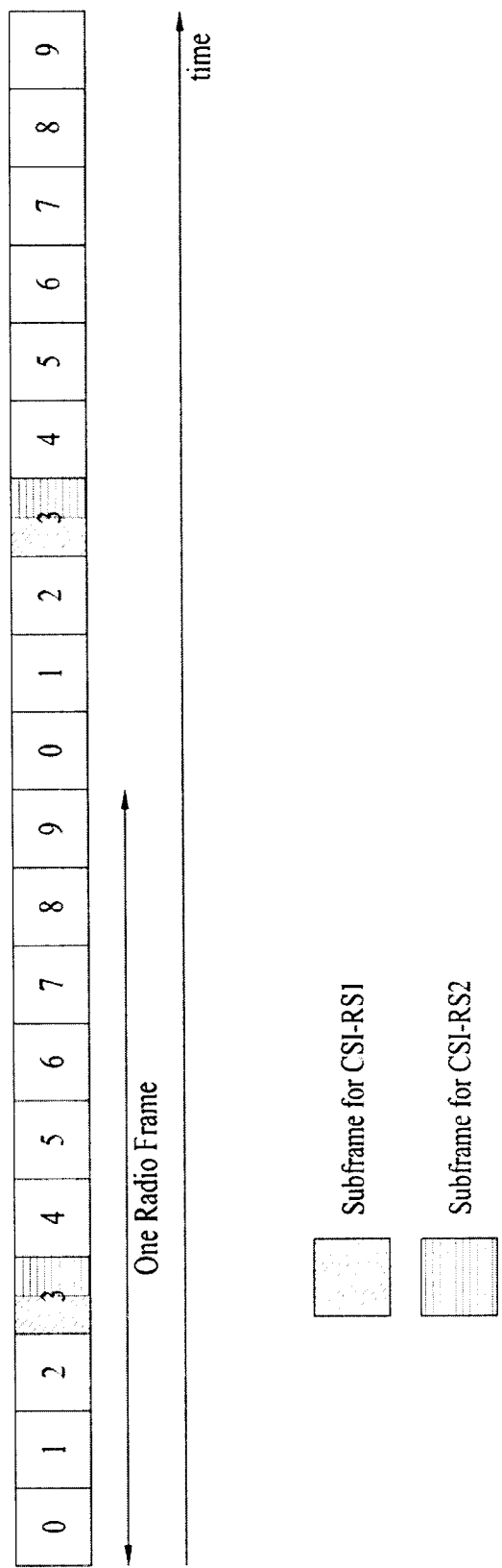
FIG. 12 is a diagram for embodiment of mapping to make multiple CSI-RSs to be transmitted in an identical subframe.

FIG. 12 is a diagram for embodiment of mapping to make multiple CSI-RSs to be transmitted in an identical subframe. Referring to FIG. 12, a first CSI-RS according to a first CSI-RS configuration and a second CSI-RS according to a second CSI-RS configuration are mapped to an identical subframe. The first CSI-RS is configured to have a transmission period of 10 ms (i.e., 10 subframes) and a CSI-RS transmission offset of 3. In the same manner, the second CSI-RS is identically configured to have a transmission period of 10 ms and a CSI-RS transmission offset of 3. Hence, both of the first and the second CSI-RS are transmitted in an identical subframe.

In this case, the first CSI-RS and the second CSI-RS can be mapped to resource elements different from each other in the identical subframe (i.e., can be multiplexed by a FDM scheme). And, in case that the first CSI-RS and the second CSI-RS can be mapped to an identical resource element, each of the first CSI-RS and the second CSI-RS can be distinguished from each other in a manner of differently designating each scrambling code (i.e., can be can be multiplexed by a CDM scheme).

And, a first CSI-RS base station can transmit a first CSI-RS configuration information and a second CSI-RS configuration information to the base station. In addition to this, the first CSI-RS base station can transmit an aggregated indicator indicating a feedback of an aggregated CSI using the first CSI-RS and the second CSI-RS to the UE.

Figure 13:
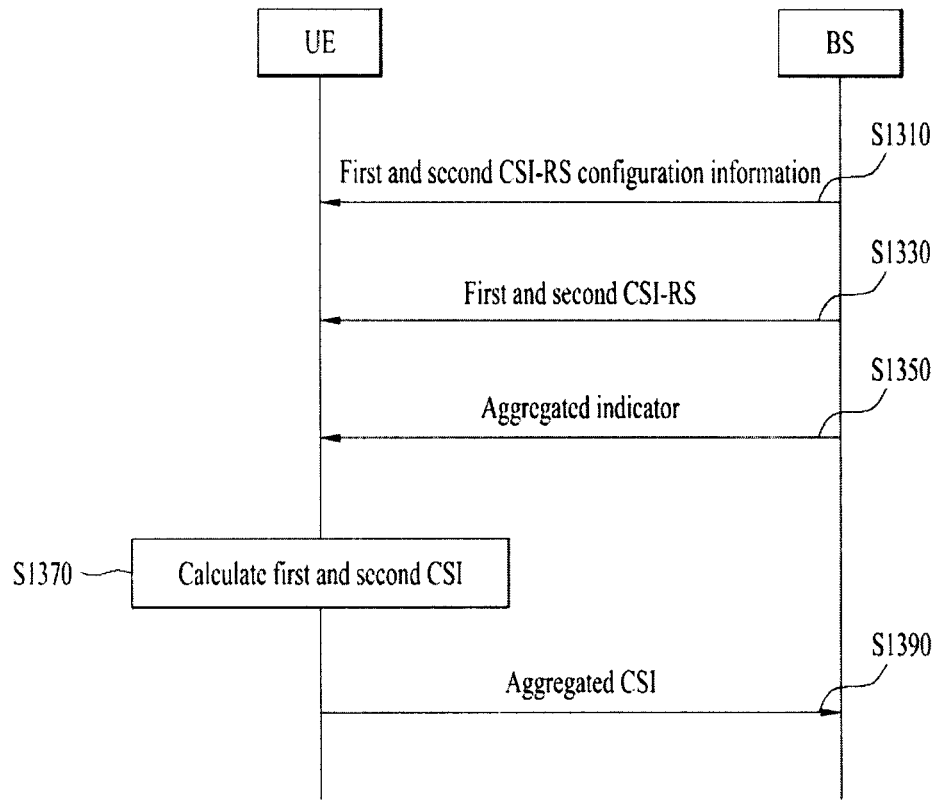
FIG. 13 is a flowchart indicating an aggregated CSI feedback method according to one embodiment of the present invention.

FIG. 13 is a flowchart indicating an aggregated CSI feedback method according to one embodiment of the present invention.

Referring to FIG. 13, first of all, a base station respectively transmits a first CSI-RS configuration and a second CSI-RS configuration information in response to a first base station and a second base station participating in a cooperative transmission [S1310]. The first and the second CSI-RS configuration information include an identical period and an offset to enable a first CSI-RS and a second CSI-RS to be transmitted in an identical subframe.

Subsequently, the base station transmits the first CSI-RS and the second CSI-RS based on the first CSI-RS configuration information and the second CSI-RS configuration information [S1320]. In this case, the first CSI-RS and the second CSI-RS can be transmitted in the identical subframe in a manner of being mapped to resource elements different from each other (i.e., can be multiplexed by FDM scheme). Or, although the first CSI-RS and the second CSI-RS are mapped to an identical resource element, each scrambling code can be designated to be orthogonal to each other (i.e., can be multiplexed by CDM scheme). And, the base station can transmit an aggregated indicator indicating a feedback of an aggregated CSI using the first CSI-RS and the second CSI-RS to the UE [S1350].

Subsequently, the UE calculates a first CSI and a second CSI using the first CSI-RS and the second CSI-RS, respectively and then calculates the aggregated CSI using the calculated first CSI and the second CSI. The aggregated CSI can include at least one selected from the group consisting of an aggregated rank indicator (RI), an aggregated precoding matrix indicator (PMI), an aggregated channel quality indicator (CQI), and phase information between CSI-RSs. In case of the aggregated CQI, the aggregated CQI can be calculated on the basis of signal to interference ratio (SINR) when a cooperative transmission is performed by two CoMP base stations.

In this case, SINR can be represented as follows.

$$\sigma_{agg} = \frac{|uh_1v_1 + c_2uh_2v_2|^2}{N} \quad \text{[Formula 12]}$$

In this case, u is a reception beamforming vector. h1 and h2 indicate a first CoMP transmission point (base station)

and a second CoMP transmission point, respectively. And, v1 and v2 indicate a transmission beamforming vector of the first CoMP transmission point and a transmission beamforming vector of the second CoMP transmission point, respectively. And, c2 indicates a phase corrector of the second transmission point. N indicates an interference signal coming from a different point except the CoMP transmission point and power of noise.

And, the UE estimates channels from two transmission points different from each other using the first CSI-RS and the second CSI-RS, respectively. The UE can calculate the aggregated CSI using an estimation value of each channel.

Figure 14:
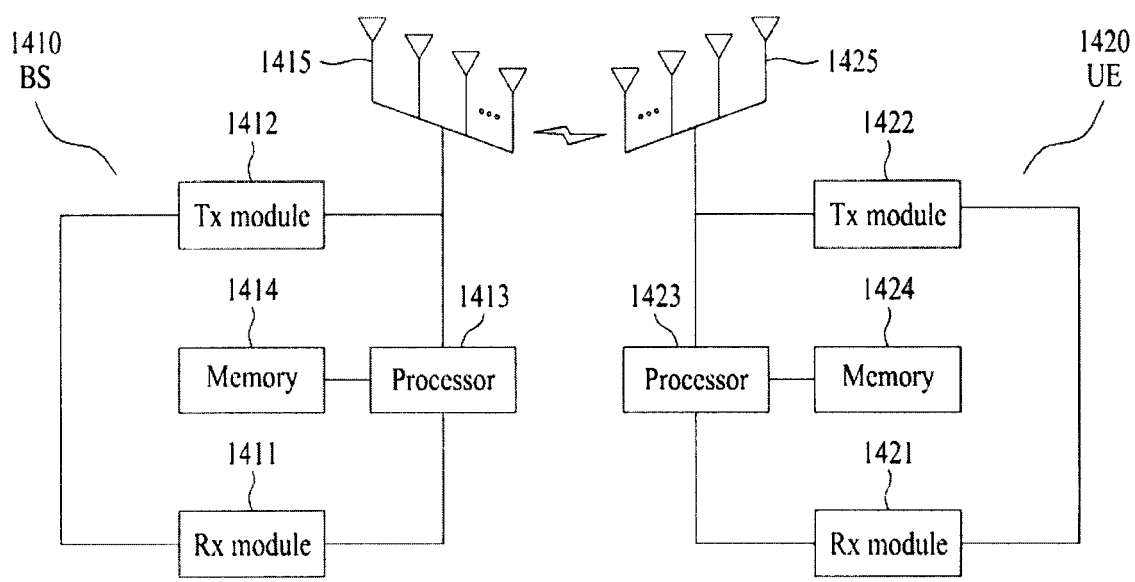
FIG. 14 is a diagram for a configuration of a preferred embodiment for a base station device 1410 and a user equipment device 1420 according to the present invention.

FIG. 14 is a diagram for a configuration of a preferred embodiment for a base station device 1410 and a user equipment device 1420 according to the present invention.

Referring to FIG. 14, a user equipment device 1420 according to the present invention may include a reception module 1421, a transmission module 1422, a processor 1423, a memory 1424, and a plurality of antennas 1425. A plurality of the antennas 1425 means the user equipment device supporting MIMO transmission and reception. The reception module 1421 can receive various signals, a data, and information in DL from the base station. The transmission module 1422 can transmit various signals, a data, and information in UL to the base station. The processor 1423 can control overall operations of the user equipment device 1420.

The user equipment device 1420 according to one embodiment of the present invention can be configured to transmit aggregated channel state information using CSI-RSs transmitted from a plurality of base stations supporting a cooperative transmission. The processor 1423 of the user equipment device 1420 can be configured to receive a first CSI-RS configuration information and a second CSI-RS configuration information for the base station 1410 participating in the cooperative transmission. And, the processor 1423 of the user equipment device 1420 can be configured to receive a first CSI-RS and a second CSI-RS based on the first CSI-RS configuration information and the second CSI-RS configuration information. In this case, the first CSI-RS and the second CSI-RS can be transmitted in an identical subframe only. And, the processor 1423 of the user equipment device 1420 can be configured to calculate a first CSI and a second CSI using the first CSI-RS and the second CSI-RS, respectively. And, the processor 1423 of the user equipment device 1420 can be configured to transmit an aggregated CSI based on the first CSI and the second CSI.

Besides, the processor 1423 of the user equipment device 1420 is configured to perform a function of processing information received by the user equipment device 1420, information to be transmitted to an external, and the like. The memory 1424 is configured to store the processed information for a prescribed time and can be substituted by such a configuration element as a buffer (not depicted), or the like.

Referring to FIG. 14, a base station device 1410 according to the present invention may include a reception module 1411, a transmission module 1412, a processor 1413, a memory 1414, and a plurality of antennas 1415. A plurality of the antennas 1415 means the user equipment device supporting MIMO transmission and reception. The reception module 1411 can receive various signals, a data, and information in DL from the base station. The transmission module 1412 can transmit various signals, a data, and information in UL to the base station. The processor 1413 can control overall operations of the base station device 1410.

The base station 1410 according to one embodiment of the present invention can be configured to receive aggregated channel state information on a cooperative transmission. The processor 1413 of the base station device 1410 can be configured to respectively transmit a first CSI-RS configuration information and a second CSI-RS configuration information for a first base station and a second base station participating in the cooperative transmission. And, the processor 1413 of the base station device 1410 can be configured to transmit a first CSI-RS and a second CSI-RS based on the first CSI-RS configuration information and the second CSI-RS configuration information. In this case, the first CSI-RS and the second CSI-RS can be transmitted in an identical subframe only. And, the processor 1413 of the base station device 1410 can be configured to receive an aggregated CSI calculated based on a first CSI according to the first CSI-RS and a second CSI according to the second CSI-RS.

Besides, the processor 1413 of the base station device 1410 is configured to perform a function of processing information received by the base station device 1410, information to be transmitted to an external, and the like. The memory 1414 is configured to store the processed information for a prescribed time and can be substituted by such a configuration element as a buffer (not depicted), or the like.

Detail configuration of the base station device and the UE device can be implemented to independently apply the aforementioned contents explained in various embodiments of the present invention or to simultaneously apply two or more embodiments. The overlapped contents are omitted for clarity of explanation.

And, in explaining FIG. 14, explanation on the base station device 1410 can be identically applied to a relay device as a main agent of DL transmission or a main agent of UL reception. Explanation on the UE device 1420 can be identically applied to a relay device as a main agent of DL reception or a main agent of UL transmission.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

What is claimed is:

1. A method of reporting channel state information (CSI) by a user equipment (UE) in a wireless communication system, the method comprising:
    receiving, from a base station (BS), configuration information about a plurality of CSI-reference signals (CSI-RSs);
    obtaining CSI based on the configuration information; and
    reporting, to the BS, the CSI,
    wherein the configuration information includes information about a CSI-RS periodicity which is commonly used for the plurality of CSI-RSs, and
    wherein the plurality of CSI-RSs are transmitted in a same time resource.

2. The method of the claim 1, wherein the configuration information further includes information about a CSI-RS offset which is commonly used for the plurality of CSI-RSs.

3. The method of the claim 2, wherein the plurality of CSI-RSs are aggregated in the same time resource based on the CSI-RS periodicity and the CSI-RS offset.

4. The method of the claim 1, wherein each of the plurality of CSI-RSs is related to a respective one of a plurality of antenna ports.

5. The method of claim 1, wherein the CSI includes at least one of a channel quality indicator (CQI), a rank indicator (RI), and a precoding matrix index (PMI).

6. The method of the claim 1, wherein the CSI is an aggregated CSI based on the plurality of CSI-RSs.

7. The method of the claim 1, wherein the configuration information are received through UE-dedicated Radio Resource Control (RRC) signaling.

8. A method of receiving channel state information (CSI) by a base station (BS) in a wireless communication system, the method comprising:
    transmitting, to a user equipment (UE), configuration information about a plurality of CSI-reference signals (CSI-RSs); and
    receiving, from the UE, CSI,
    wherein the configuration information includes information about a CSI-RS periodicity which is commonly used for the plurality of CSI-RSs, and
    wherein the plurality of CSI-RSs are transmitted in a same time resource.

9. The method of the claim 8, wherein the configuration information further includes a CSI-RS offset which is commonly used for the plurality of CSI-RSs.

10. The method of the claim 9, wherein the plurality of CSI-RSs are aggregated in the same time resource based on the CSI-RS periodicity and the CSI-RS offset.

11. The method of the claim 8, wherein each of the plurality of CSI-RSs is related to a respective one of a plurality of antenna ports.

12. The method of claim 8, wherein the CSI includes at least one of a channel quality indicator (CQI), a rank indicator (RI), and a precoding matrix index (PMI).

13. The method of the claim 8, wherein the CSI is an aggregated CSI based on the plurality of CSI-RSs.

14. The method of the claim 8, wherein the configuration information are transmitted through UE-dedicated Radio Resource Control (RRC) signaling.

15. A user equipment (UE) configured to report channel state information (CSI) in a wireless communication system, the UE comprising:
    a transmission module;
    a reception module; and
    at least one processor configured to control the transmission module and the reception module,
    wherein the at least one processor is further configured to:
    control the reception module to receive, from a base station (BS), configuration information about a plurality of CSI-reference signals (CSI-RSs);
    obtain CSI based on the configuration information; and
    control the transmission module to report, to the BS, the CSI,
    wherein the configuration information includes information about a CSI-RS periodicity which is commonly used for the plurality of CSI-RSs, and
    wherein the plurality of CSI-RSs are transmitted in a same time resource.

16. A base station (BS) configured to receive channel state information (CSI) in a wireless communication system, the BS comprising:
    a transmission module;
    a reception module; and
    at least one processor configured to control the transmission module and the reception module,
    wherein the at least one processor is further configured to:
    control the transmission module to transmit, to a user equipment (UE), configuration information about a plurality of CSI-reference signals (CSI-RSs); and
    control the reception module to receive, from the UE, CSI,
    wherein the configuration information includes information about a CSI-RS periodicity which is commonly used for the plurality of CSI-RSs, and
    wherein the plurality of CSI-RSs are transmitted in a same time resource.

* * * * *